June 3, 1930.  W. F. BROWN  1,761,190
GLASS TANK FURNACE
Filed Feb. 3, 1927
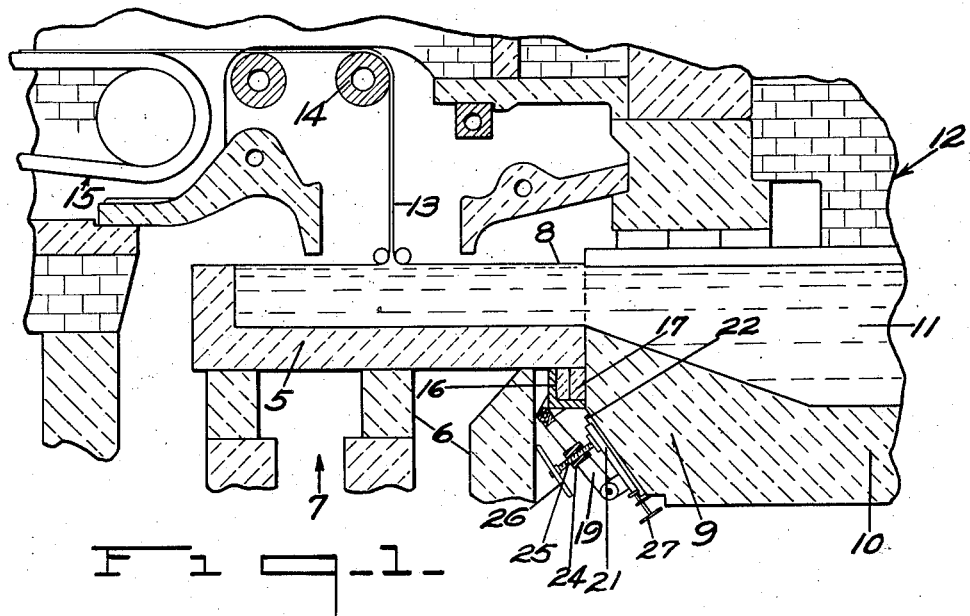
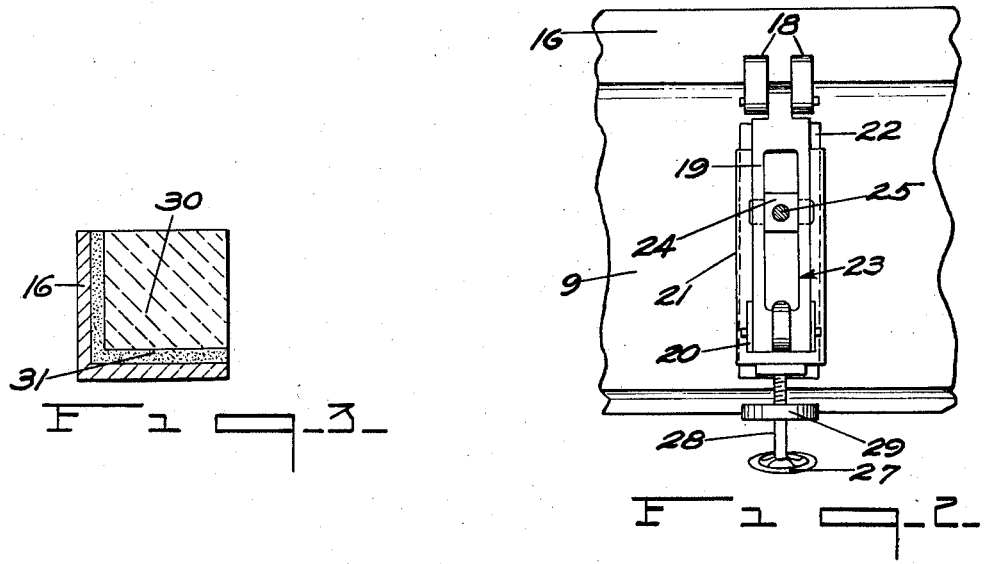
Inventor
Wilbur F. Brown
By Frank Fraser Patented June 3, 1930

1,761,190

UNITED STATES PATENT OFFICE

WILBUR F. BROWN, OF TOLEDO, OHIO, ASSIGNOR TO LIBBEY-OWENS GLASS COMPANY, OF TOLEDO, OHIO, A CORPORATION OF OHIO

GLASS-TANK FURNACE

Application filed February 3, 1927. Serial No. 165,525.

This invention relates broadly to new and useful improvements in glass tank furnaces.

In the ordinary glass tank construction for manufacturing sheet glass, the working end thereof known as the "cooling chamber" joins the open end of the draw-pot by the two ends being merely butted together. It is almost impossible to form a joint in this manner which will prevent the leakage of the molten glass thereabove no matter how smooth the surfaces are forming the joint. Heretofore, in order to prevent or minimumize this leakage of the molten glass, it has been customary to position a pipe cooler beneath the draw-pot at the juncture thereof with the "cooling chamber" in order to freeze the glass and thus prevent it from leaking through the joint. However, the freezing of this glass results in the formation of considerable dog-metal, or devitrified glass, at the juncture of the draw-pot and "cooling chamber". This dog-metal creates lines, blisters and other defects in the sheet. Also, when a certain amount of this dog-metal has been formed, it is necessary that it be removed and this can only be accomplished by discontinuing production and boiling out the draw-pot and "cooling chamber".

An important object of the present invention is to provide in a glass tank furnace, improved means at the juncture of the draw-pot and cooling chamber for preventing the molten glass from leaking from the furnace at this point without the necessity of freezing the said glass, thereby reducing to a minimum, if not entirely eliminating, the formation of dog-metal with its resultant disadvantages.

Another object of the invention is to provide in a glass tank furnace, improved means formed from refractory material and arranged at the juncture of the draw-pot and cooling chamber and contacting therewith for preventing the leakage of molten glass from the furnace at this point.

A further object of the invention is the provision of means for forcing the refractory means against the draw-pot and cooling chamber and for adjusting said means vertically and horizontally.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through a portion of a glass tank furnace showing the present invention associated therewith.

Fig. 2 is a detailed elevation of the present invention, and

Fig. 3 is a section showing a slight modification.

Referring now to the drawings and more particularly to Figs. 1 and 2, the numeral 5 designates a draw-pot supported upon stools 6 positioned within a heating chamber 7. The end 8 of the draw-pot 5 is in open communication with the goose-neck 9 of a cooling chamber 10. Molten glass 11 is supplied to the cooling chamber 10 and draw-pot 5 from the melting end of a tank furnace 12. From the molten glass in the draw-pot 5 a sheet of glass 13 is vertically drawn over a bending roll 14 by means of the drawing mechanism 15.

As shown, the end 8 of the draw-pot 5 is simply butted up against the goose-neck 9 of the cooling chamber 10 with the result that unless means is provided to prevent it, molten glass will leak from the furnace at this point. Heretofore, in order to prevent this leakage, a pipe cooler has been positioned beneath the draw-pot at the juncture thereof with the cooling chamber in order to freeze the glass but the disadvantages of such an arrangement have been clearly brought out above.

It is an aim of the present invention to provide improved means at the juncture of the draw-pot and cooling chamber for preventing the molten glass from leaking from the furnace at this point without the necessity of freezing the same so that the formation of dog-metal will be reduced to a minimum. In order that this might be achieved, there is provided a preferably metallic frame or casing 16 of substantially L-shaped formation in cross section as shown in Fig. 1. This frame or casing extends the entire width of the draw-pot 5 and has arranged therein one or any number of slabs or blocks 17 of refractory or any other suitable material and which are adapted to contact with the bottom of the draw-pot 5, adjacent the face of the gooseneck 9.

The refractory members or blocks 17 are adapted to be pressed or forced against the said draw-pot and cooling chamber whereby to form an exceedingly tight joint which will prevent leakage of the molten glass. To accomplish this, there is carried by the frame 16 a pair of ears 18 between which is pivotally mounted one end of a link 19, the opposite end thereof being pivoted between ears 20 carried by the slide plate 21 slidably mounted on a stationary base plate 22. The link 19 is provided with a longitudinally extending slot 23 and arranged therein is a block 24 provided with a threaded opening for receiving therethrough a screw threaded rod 25 carried by said slide plate 21. A hand wheel 26 is carried by the rod 25 and upon rotation thereof, the frame 16 and refractory members or blocks 17 can be moved towards or away from the draw-pot 5 and gooseneck 9.

The slide plate 21 is adapted to be adjusted vertically by means of the hand wheel 27 carried upon the outer end of a rod 28 which passes through a guide bearing 29 and is secured at its inner end to the said slide plate 21. Thus, upon proper manipulation of the hand wheels 26 and 27, the refractory members 17 can be pressed or impinged against the draw-pot 5 and goose-neck 9 to provide an exceedingly tight joint which will effectively prevent the leakage of the molten glass from the furnace at the juncture of the said draw-pot and cooling chamber.

If preferred, instead of using the refractory blocks 17, the frame 16 can be first placed in position and a plastic refractory material worked into the frame and permitted to harden as indicated at 30, in Fig. 3. Also, if desired, suitable insulation 31 can be positioned between the refractory material 30 and frame 16 to protect said frame from the high temperature of said refractory material. This insulation can also be placed between the refractory blocks 17 and frame 16.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A glass tank furnace adapted to contain a mass of molten glass and including a cooling chamber, a draw-pot abutting said cooling chamber, means arranged at the juncture of said draw-pot and cooling chamber for preventing the molten glass from leaking from the furnace at this point, and means for moving said first named means vertically and horizontally to force the same against said draw-pot and cooling chamber.

2. A glass tank furnace adapted to contain a mass of molten glass and including a cooling chamber, a drawpot abutting said cooling chamber, means formed from refractory material arranged at the juncture of and contacting with said draw-pot and cooling chamber for preventing the molten glass from leaking from the furnace at this junction, means for supporting said refractory means, and means connected with said supporting means for adjusting the same together with said refractory means vertically and horizontally to force the latter against said draw-pot and cooling chamber.

3. A tank furnace adapted to contain a mass of molten glass and including a cooling chamber, a draw-pot abutting said cooling chamber, non-plastic means arranged at the juncture of said draw-pot and cooling chamber for preventing the molten glass from leaking from the furnace at this point, and means for moving said non-plastic means horizontally to force the same against the cooling chamber.

4. A glass tank furnace adapted to contain a mass of molten glass and including a cooling chamber, a draw-pot abutting said cooling chamber, and means arranged at the juncture of said draw-pot and cooling chamber for preventing the molten glass from leaking from the furnace at this point, said means including a casing, refractory means carried by the casing, a slide plate, a link pivotally associated with the casing and slide plate, and means associated with the slide plate and link for moving the casing horizontally to force the refractory means against the cooling chamber.

5. A glass tank furnace adapted to contain a mass of molten glass and including a cooling chamber, a draw-pot abutting said cooling chamber, and means arranged at the juncture of said draw-pot and cooling chamber for preventing the molten glass from leaking from the furnace at this point, said means including a casing, a refractory means carried by the casing, a slide plate, a link pivotally associated with the casing and slide plate, means associated with the slide plate and link for moving the casing horizontally to force the refractory means against the cooling chamber, and means for moving the slide plate to force the refractory means vertically against the draw-pot.

6. A glass tank furnace adapted to contain a mass of molten glass and including a cooling chamber, a draw-pot abutting said cooling chamber, and means arranged at the juncture of said draw-pot and cooling chamber for preventing the molten glass from leaking from the furnace at this point, said means including a casing, refractory means carried by the casing, a base plate carried by the cooling chamber, a slide plate thereon, a link pivotally connected to the casing and slide plate, and means carried by the slide plate and associated with said link for moving the casing horizontally to force the refractory means against the cooling chamber.

7. A glass tank furnace adapted to contain a mass of molten glass and including a cooling chamber, a draw-pot abutting said cooling chamber, and means arranged at the juncture of said draw-pot and cooling chamber for preventing the molten glass from leaking from the furnace at this point, said means including a casing, refractory means carried by the casing, a base plate carried by the cooling chamber, a slide plate thereon, a link pivotally connected to the casing and slide plate, means carried by the slide plate and associated with said link for moving the casing horizontally to force the refractory means against the cooling chamber, and means associated with the slide plate for moving the same to force the refractory means vertically against the draw-pot.

8. A tank furnace adapted to contain a mass of molten glass and including a cooling chamber, a draw-pot abutting said cooling chamber, and means arranged at the juncture of said draw-pot and cooling chamber for preventing the molten glass from leaking from the furnace at this point comprising a casing, refractory material carried by the casing and contacting with the under surface of the draw-pot, and means connected to the casing for moving said casing horizontally to force the refractory material against the cooling chamber while it remains in contact with said draw-pot.

Signed at Toledo, in the county of Lucas and State of Ohio, this 1st day of February, 1927.

WILBUR F. BROWN.